United States Patent [19]

Miller

[11] Patent Number: 4,790,591
[45] Date of Patent: Dec. 13, 1988

[54] REMOVABLE PROTECTIVE VEHICLE WINDSHIELD SCREEN

[76] Inventor: Jess J. Miller, 220-C Lakewood Cir., Margate, Fla. 33063

[21] Appl. No.: 98,886

[22] Filed: Sep. 21, 1987

[51] Int. Cl.[4] .............................................. B60J 3/00
[52] U.S. Cl. ............................... 160/370.2; 296/97.7; 160/354; 160/368 S
[58] Field of Search ................ 296/97 C, 97 D, 97 R, 296/95 C, 97 E; 160/DIG. 2, DIG. 7, 368 S, 354; 428/918, 913, 216

[56] References Cited

U.S. PATENT DOCUMENTS

| | | | |
|---|---|---|---|
| 4,020,826 | 5/1977 | Mole | 160/DIG. 7 |
| 4,391,865 | 7/1983 | Constance | 160/DIG. 7 |
| 4,399,347 | 8/1983 | Schmidt | 296/95 C |
| 4,560,245 | 12/1985 | Sarver | 296/97 D |

Primary Examiner—Robert R. Song
Attorney, Agent, or Firm—Basile and Hanlon

[57] ABSTRACT

A removable screen adapted to be attached to the interior of a vehicular windshield and configured to cover and correspond thereto for inhibiting the transfer of heat, solar energy, ultraviolet radiation and the like through the windshield into the interior of the associated vehicle. The removable screen includes a flexible sheet having dimensions corresponding to the vehicular windshield which is composed of a metallized plastic film, and means for removably mounting the flexible sheet of the interior of the windshield. The flexible sheet may be composed of multiple layers of the metallized plastic film which are joined to define at least one sealed air pocket. The metallized plastic film employed is essentially impervious to the transfer of air in addition to the transfer of heat and ultraviolet energy.

14 Claims, 1 Drawing Sheet

REMOVABLE PROTECTIVE VEHICLE WINDSHIELD SCREEN

BACKGROUND OF THE INVENTION

I. Field of the Invention:

This invention relates in general to devices which will prevent the penetration of ultraviolet light and heat through vehicular windshields. More particularly, this invention relates to detachable devices which provide a removable reflective surface for the interior of vehicular windshields.

II. Description of the Relevant Art:

As is well known, heat build-up within a closed vehicle such as a boat, automobile, or airplane, can reach very high temperatures when that vehicle is parked for long periods in the sun. This is particularly problematic in warmer areas of the country which experience more intense and prolonged periods of sunshine. The interior vehicular heat build-up is uncomfortable for people who must enter such vehicles. This heat build-up places a heavy load on any air-conditioning equipment which may be present in the vehicle, shortens the life of the air-conditioning equipment, and increases operating costs. Even more damaging, are the effects of prolonged exposure to ultraviolet light which can damage and destroy the plastic, fabric and other materials within the automobiles. Additionally, and even more expensively, prolonged exposure to excessive heat can damage and destroy sensitive navigational and communications equipment such as the avionics present in aircraft.

Many windshield covers have been suggested and developed for attachment to the outer surface of windshields to inhibit ice formation thereon. These covers are often constructed of transparent sheets or plastic film. Such covers do not prevent heat build-up within the vehicle and are virtually useless in deflecting or preventing the penetration of ultraviolet rays.

A window cover system as disclosed in U.S. Pat. No. 4,209,197 is mounted on the exterior surface of all windows of an automotive vehicle. The covers are opaque and are intended for prevention of ice formation in the winter and heat build-up in the summer. As is the case with all exterior mounted covers, there can be problems with displacement due to wind, weight of snow, and the like. Additionally, these covers are prone to theft and can be easily lost.

The curtain structure of U.S. Pat. No. 4,109,957 is removably mounted on the interior surface of the vehicular windshield and the two adjacent side windows. The curtain is constructed of an opaque woven cloth material to provide privacy for the occupants of recreational vehicles, vans and the like. Because the privacy curtain disclosed in this patent is constructed of an opaque woven cloth, it will inherently reduce a certain amount of heat build-up if used for that purpose. However, since this cover was not intended for use in reducing heat build-up in vehicles, it is less than ideal for that purpose. Cloth materials while being effective for providing privacy, are not effective barriers to block solar radiation due to the porosity of the cloth.

U.S. Pat. No. 4,560,245 to Sarver discloses a vehicular screen which can be affixed to the windshield of an automobile. The curtain is formed of a flexible sheet of light-impervious material having a light colored outwardly facing surface and a dark inwardly facing surface which is light absorptive. The light colored outwardly facing surface of the windshield curtain reflects a large percentage of the sun's rays and the accompanying heat when fastened in place over the interior of a vehicle's windshield. The windshield curtain disclosed in Sarver is made of a heavy, thick laminated material which is difficult to fold and store. The material is generally rubber, silicone or the like, chosen for its flexibility and insulating characteristics. Such materials are susceptible to decomposition after prolonged exposure to ultraviolet radiation and can become brittle and crack.

The Sarver windshield curtain is adapted to be fastened to the windshield of the vehicle in a manner which permits a gap to exist between the inner surface of the windshield and the curtain. This configuration fails to enhance the limited capacity of the windshield to filter ultraviolet radiation.

Additionally, in the preferred embodiment, the Sarver device is designed to be maintained on the dashboard at all times. Thus, the curtain prevents the use of the dashboard for any dashboard-mounted devices such as compasses, citizen band radios or the like. Furthermore, the Sarver device is not readily adaptable for water vessels, aircraft, or automobiles which do not have the pronounced dashboards or complete dashboards. Additionally, the device must be lowered in a particular folded manner to ensure that the non-reflective surface is exposed when the curtain is at rest on the dashboard. This is necessary to prevent glare and the like from distracting the operator of the vehicle.

Therefore, it would be desirable to provide a removable windshield screen which could be employed successfully on a variety of different mobile vehicles such as automobiles, water craft, and aircraft. It is also desirable that the windshield screen provide a high degree of reflectivity and imperviousness to ultraviolet rays and be adapted to be positioned against the windshield in a manner which enhances any ultraviolet filtering characteristics which the windshield glass may already possess. It is also desirable that the screen be constructed of a material which will not decompose upon prolonged exposure to ultraviolet radiation and is capable of a high degree of insulation and can be stored in a compact manner.

SUMMARY OF THE INVENTION

In accordance with the present invention, a windshield curtain is disclosed for reducing heat build-up in the interior of various mobile vehicles and preventing the penetration of ultraviolet radiation therein.

The removable screen of the present invention is comprised of a structured flexible sheet having dimensions equivalent to the associated vehicular windshield. Preferably, the structured flexible sheet has a plurality of separate joined layers suitably fastened one to the other to form air pockets therebetween. The structured flexible sheet also has suitable means for removably mounting it to the interior of the windshield. The removable screen is formed of layers of a flexible, light-impervious, metallized plastic film. Each layer of the metallized plastic film has at least one highly reflective surface. The layers of the removable screen are positioned such that the highly reflective surfaces are positioned facing outward from either outer surface of the flexible sheet.

The layers of metallized plastic film will reflect large amounts of solar radiation including increased amounts of ultraviolet radiation. The layers of metallized plastic film are also essentially gas-impervious. Thus, the air pockets formed between the layers of the removable screen of the present invention provide insulation characteristics which increase the insulative value of the removable screen without appreciably increasing thickness or weight of the screen. Thus, the removable screen of the present invention is a light-weight device for insulating the vehicle, helping to reduce heat transfer and keep the vehicle relatively cool.

When in place, the removable screen of the present invention is preferably adapted to contact the latter surface of the vehicle's windshield over the majority of the inner surface. It has been found that this orientation can work with any inherent ultraviolet reflective properties in the windshield glass to increase the ultraviolet imperviousness.

When the vehicle is to be operated, the removable screen can be completely removed from the windshield and can be compactly folded and stored in a suitable storage container such as an automobile glove compartment or the like. It has been found, quite unexpectedly, that metallized plastic film is highly impervious to the detrimental effects of ultraviolet radiation. Thus, it can be used for prolonged periods of time, folded compactly, and reused without significant degradation to the screen itself.

BRIEF DESCRIPTION OF THE DRAWING

Throughout the various figures of the drawing, like reference numerals are used for like elements therein. In the drawing.

DESCRIPTION OF THE PREFERRED EMBODIMENT

Figure 1:
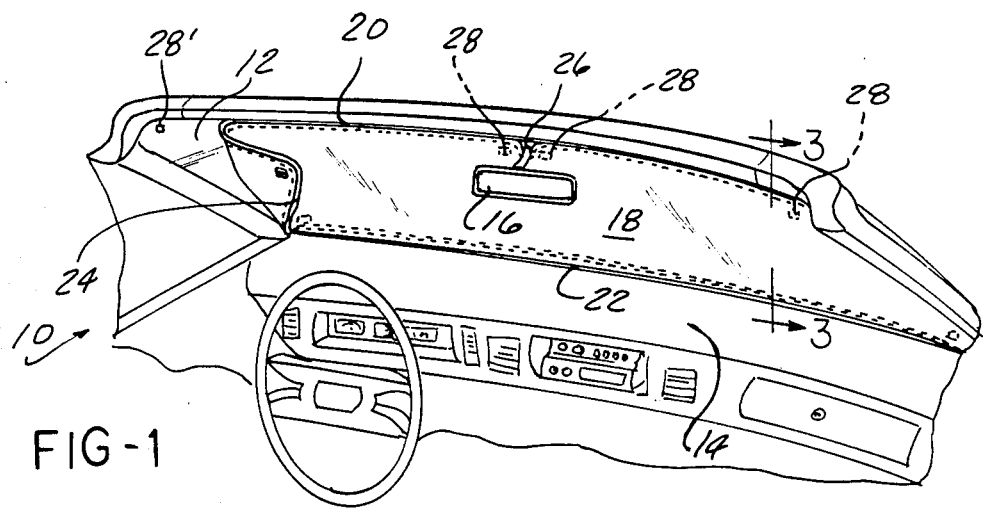
FIG. 1 is a perspective view of the interior of a typical automobile which is provided with a windshield curtain of the present invention. The curtain is shown in the use position.

Referring to FIG. 1, there is shown a fragmentary view of the interior of a typical automotive vehicle 10 which is provided with the usual windshield 12, dashboard 14, rearview mirror 16 and the like. The vehicle 10 is shown as being provided with the removable screen 18 of the present invention. It is to be understood that, once one reasonably skilled in the art has reviewed the ensuing description, it will be readily apparent to that person how this device can be adapted for use on aircraft, water vessels and the like.

The removable screen 18 is fabricated of material having special characteristics which will be described hereinafter in detail. The removable screen 18 is sized and configured to substantially match with the shape of the particular associated windshield 12. Therefore, in most applications, the removable screen 18 will be of substantially rectangular shape having elongated top and bottom edges 20 and 22, respectively, and opposed side edges 24. Additionally, the removable screen 18 may be notched as at 26 to provide clearance for the rearview mirror 16 if the vehicle 10 upon which the curtain is to be installed is provided with its mirror mounted in a manner which would otherwise interfere with the installation of the curtain.

It is to be understood that the removable screen 18 of the present invention can be custom made to the dimensions of the associated windshield to insure a custom and efficient fit.

The mounting means for removably mounting the removable screen 18 on the interior surface of the windshield 12 may be any suitable type, such as suction cups (not shown) or snaps (not shown) attached to the windshield or the like. However, it is preferred that the fastener means 28 be detachably interconnected fabric portions of the knit loop and hook type, commonly known by the trade name VELCRO. As is well known, fasteners of this type include fabric strips of knit loops within a mating fabric strip of hooks which do mountably interlock with each other when pressed together.

Figure 2:
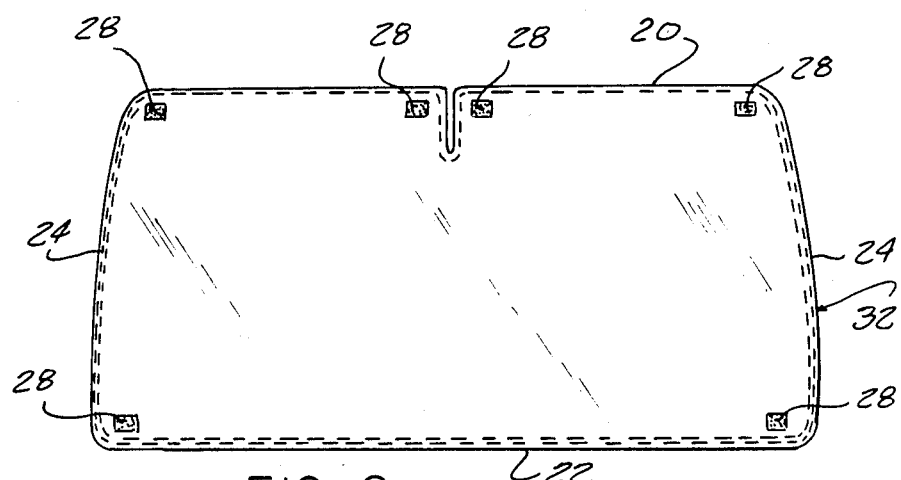
FIG. 2 is a detailed drawing of a typical removable screen of the present invention.

In the preferred embodiment, the fastener elements 28 are small, discrete members which are positioned at the various corners of the removable screen 18. In the embodiment shown in FIGS. 1 and 2, fastener members 28 are positioned at the junctures between the top edge 20 and the opposed side edges 24, between the bottom edge 22 and the opposed side edges 24, and at the junctures between the notch 26 and the top edge 20. Suitable mating portions 28', such as that shown in FIG. 1, are correspondingly installed on the interior of the windshield 12. It is to be understood that the fastener members 28 can be attached to the moldings or windshield gaskets corresponding to the windshield 12 if desired.

Figure 3:
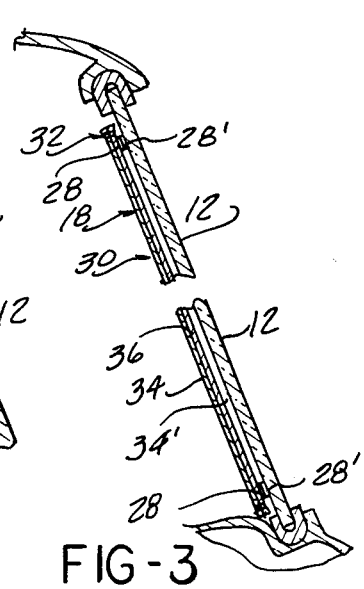
FIG. 3 is a cross-sectional view taken along the line 3—3 of FIG. 1.

Due to the high temperatures involved, the use of special fastener strips which are provided with high temperature adhesives is recommended. Such fastener strips are available from the 3-M Corporation of St. Paul, Minn. which markets these products under its trademark SCOTCH MATE. With the fasteners 28, 28' affixed to both the windshield 12 and the removable screen 18, the removable screen 18 can be removably attached to the windshield in a co-extending relationship with respect to the interior surface of the windshield as shown in FIGS. 1 and 3. When so disposed, the removable screen 18 will inhibit heat build-up within the vehicle by substantially reducing heat transfer through the windshield. Additionally, the removable screen 18 will substantially block all ultraviolet radiation passing through the windshield.

When the vehicle 10 is to be driven, the removable screen 18 may be completely removed, compactly folded and stored in a remote area such as in the trunk (not shown) or glove compartment of the passenger vehicle.

Figure 4:
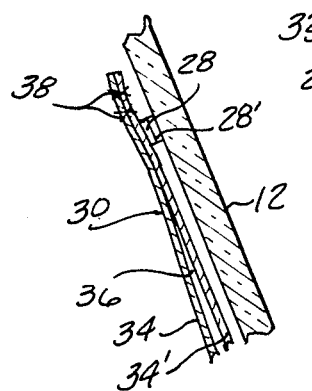
FIG. 4 is a fragmentary detailed view of FIG. 3 of the area of attachment between the windshield and curtain of the present invention.

As was mentioned previously, the removable screen 18 of the present invention is fabricated of a material which has special characteristics to minimize heat transfer and the permeation of ultraviolet radiation through the windshield. Heat build-up within the vehicle as a result of convection is eliminated by the presence of the removable screen 18 of the present invention. The removable screen 18, when in place, is placed proximate to the interior of the windshield 12 and can act as a barrier to air currents. The removable screen 18 may be placed in position such that the surface of removable screen 18 contacts the interior of the windshield 12 in the manner shown in FIGS. 3 and 4. Alternately, the removable screen may be positioned in spaced relationship from the interior surface of the windshield. Preferably this distance is no more than 0.25 inches from the windshield. It has been found, quite unexpectedly, that placement of the removable screen 18 in this manner appear to enhance the ability of the screen 18 and windshield 12 to deflect and reflect ultraviolet radiation.

In order to eliminate heat build-up within the vehicle as a result of solar radiation through the windshield, the removable screen is provided with a flexible sheet 30 which is impervious to the passage of light and ultraviolet radiation. The light-impervious, multi-ply flexible sheet 30 has an outer peripheral edge 32 and is composed of a plurality of individual layers 34. The layers 34 are continuously joined adjacent to the outer peripheral edges 32 to form the single multi-ply flexible sheet 30. In joining the layers, one or more air pockets 36 are formed in the interior of the structured flexible sheet 30. These air pockets 36 extend along the entire area of the interior of the removable screen 18. The air pockets 36 provide a "dead-air" space which greatly enhances the insulative value of the removable screen 18.

In the preferred embodiment, the removable screen 18 is comprised of at least two layers 34 of metallized plastic film to form the structured flexible sheet 30. Metallized plastic film suitable for this invention is commercially available from Phoenix Films Inc., Clearwater, Fla. In constructing the structured flexible sheet, the metallized plastic film has a highly reflective face and a slightly less reflective face with the individual sheets having a width between about 10 inches and about 100 inches and a thickness between about 12 microns to 15 microns. The metallized plastic film is selected from the group consisting of metallized nylon, metallized polyethylene, metallized polyester, metallized polypropylene, metallized polycarbonate, metallized polysulfone, and mixtures thereof. In the preferred embodiment, metallized nylon is employed, however, it is to be understood that layers of different material can be used.

The metallized plastic film employed in the present invention generally has a highly reflective side and a less reflective side. The highly reflective side is generally due to the deposition of metal onto a plastic substrate in certain situations. The deposited metal can exhibit great sensitivity to moisture. Excessive amounts of water can cause the metal to oxidize. Thus the metallized plastic layers are generally oriented such that the metal surface is oriented on the interior of the structured layers where multiple layers of metallized plastic film are employed.

The metallized plastic film can also be coated with a polymeric coating prior to construction of the removable screen 18. The coating is preferably a thermoplastic material such as a polyethylene. The polymeric coating can be located on either side or both sides of the plastic film. Preferably, when used, the polymeric coating overlays the metal surface to protect it from abrasion and wear.

The various layers 34 of metallized plastic used in the present invention can be joined in any suitable manner. The layers may be fusion-sealed by applying a heat source along a continuous line to form a seam adjacent to the outer peripheral edge 32 of the various layers 34. Preferably a plurality of fusion seams will be spaced parallel to the peripheral edge 32. The fusion seams serve to form and seal the insulating air pocket or pockets and also provide a strengthened reinforcing region 38 adjacent to the peripheral edge 32 of the removable screen 18. This reinforced region helps maintain the structure of the removable screen 18 while permitting the removable screen 18 to be folded and stored. This type of reinforcement eliminates the necessity of extensive fastening means and supplemental reinforcement devices.

The heat fusion can be accomplished by the use of heat activated adhesives applied in the reinforcement region. Where metallized plastic film with a thermoplastic polymeric coating is employed, the thermoplastic properties of the coating can be used to achieve fusion sealing.

The various layers may be joined in any other manner desired. Fastening can occur by sewing, use of conventional adhesives and the like. It is also possible that various methods can be used in conjunction with one another. For example, the layers may be fusion sealed to form a reinforcement region which also contains at least one thread seam (not shown) within the area of fusion. This seam further aids in reinforcement and prevents tearing and separation of the layers.

Figure 5:
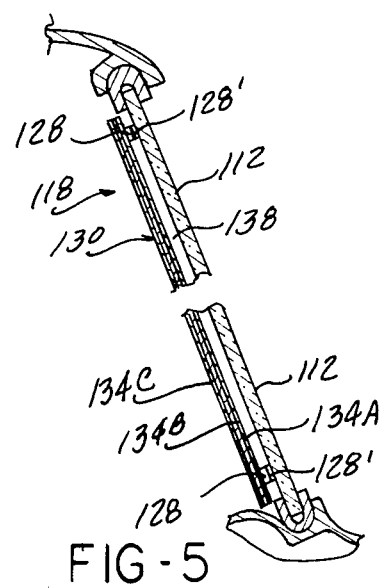
FIG. 5 is a cross-sectional view of an alternate embodiment of the present invention.

It is also within the purview of this invention to provide a removable screen constructed of a single thickness of metallized plastic film. This embodiment is shown in FIG. 5. In this embodiment, a removable screen 118 is composed of a single sheet 130 of metallized plastic film. The plastic film is, preferably, composed of a layer of polymeric substrate 134A, a metallic layer 134B and a polymeric layer 134C overlaying the metallic layer. The polymeric substrate 134A can be selected from the group consisting of nylon, polyester, polypropylene, polycarbonate, polysulfone, and mixtures thereof. The metal employed in the metallic layer 134B can be selected from any metal or metal compound which can be attachingly deposited on the polymeric substrate. The polymeric overlaying layer 134C can be selected from the group consisting of nylon, polyester, polypropylene, polycarbonate, polysulfone, polyethylene and mixtures thereof.

The removable screen 118 includes a suitable means for removably mounting the screen 118 on the interior of the windshield 112. These attaching means may be any suitable type such as suction cups (not shown) or snaps (not shown) attached to the windshield interior and corresponding locations on the screen 118. It is preferred that fasteners 128, 128' be detachably interconnected fabric portions of the knit loop and hook type, commonly known by the trade name VELCRO. The fastener elements may be small discrete members positioned in the manner described previously in relation to the embodiment shown in FIGS. 1 and 2.

The removable screen 118 is preferably placed over the interior of the windshield 112 in a manner to define an air gap 138 between the interior surface of the windshield 112 and the removable screen 118. The air gap 138 provides an insulating air space to further minimize heat transfer.

The removable screen 118 may be oriented such that either the polymeric substrate layer 134A or the polymeric overlying layer 134C are oriented toward the interior surface of the windshield 112 provided that the layer so positioned can suitably withstand prolonged exposure to sunlight and high temperatures.

The removable screen 118 may, optionally, include suitable reinforcements (not shown) proximate to the peripheral edge. These can include, but are not limited to suitable overlays or reinforcement seams, for example.

Having thus described the present invention, what is claimed is:

1. A removable screen adapted to be mounted on the interior of a windshield for inhibiting the transfer of heat, solar energy, ultraviolet radiation and the like through a windshield into the interior of the associated vehicle comprising:
   (a) a flexible sheet having an upper edge, a lower edge and two opposed side edges defining a continuous outer peripheral edge, the flexible sheet adapted to correspond in size to the associated windshield, the flexible sheet having a plurality of individual sheets of metallized nylon plastic film joined in overlying relationship to one another and defining at least one sealed air pocket positioned between the individual sheets; and
   at least one air tight seam located adjacent to the outer peripheral edge; and
   (b) means for removably mounting the flexible sheet to the interior of the windshield.

2. The removable screen of claim 1 wherein the metallized plastic film is selected from the group consisting of metallized nylon, metallized polyester, metallized polypropylene, metallized polyethylene, metallized polycarbonate, metallized polysulfonate, and mixtures thereof.

3. The removable screen of claim 2 wherein the metallized plastic film comprises:
   a polymeric substrate layer, the polymeric substrate selected from the group consisting of nylon, polyester, polypropylene, polyethylene, polycarbonate, polysulfonate and mixtures thereof;
   a metallic layer deposited on the polymeric substrate, and
   a polymeric coating overlying the metallic layer, the coating consisting of nylon, polyester, polyethylene, polycarbonate, polysulfonate and mixtures thereof.

4. The removable screen of claim 3 wherein the polymeric substrate is nylon and the polymeric coating is polyethylene.

5. The removable screen of claim 1 wherein
   each individual sheet of metallized plastic film has a highly reflective side and a less highly reflective side, the individual sheets oriented such that the highly reflective side of the respective sheets are positioned facing inwardly toward the sealed air pocket.

6. The removable screen of claim 5 wherein the flexible sheet further comprises:
   a plurality of heat-fusion seams spaced parallel to each other and located adjacent to the outer peripheral edge.

7. The removable screen of claim 6 wherein the metallized plastic film is selected from the group consisting of metallized nylon, metallized polyester, metallized polypropylene, metallized polyethylene, metallized polycarbonate, metallized polysulfonate, and mixtures thereof.

8. The removable screen of claim 7 wherein the metallized plastic film comprises a thermoplastic polymeric coating capable of melting to form a fusion seam upon application of localized heat thereto.

9. The removable screen of claim 1 wherein the flexible sheet comprises:
   a pair of individual sheets of metallized plastic film sealably joined together in overlying relationship;
   at least one air tight seam running continuously along the outer peripheral edge of the flexible sheet;
   a sealed air pocket defined by the sealably joined individual sheets.

10. The removable screen of claim 9 wherein the mounting means comprises:
    a plurality of individual fasteners comprising pairs of interconnectable fabric strips of the knit loop and hook type, the fasteners positioned such that the flexible sheet overlays the interior surface of the windshield.

11. The removable screen of claim 10 wherein the mounting means comprises:
    a plurality of individual fasteners constructed from pairs of interconnectable fabric strips of the knit loop and hook type.

12. The removable screen of claim 11 wherein an individual fastener is positioned proximate to the air tight seam at junctions between the upper edge and the two opposed side edges and at junctions between the lower edge and the two opposed side edges.

13. The removable screen of claim 4 wherein the flexible sheet is a single sheet of the metallized plastic film having a thickness between about 10 and about 15 microns.

14. A removable screen adapted to be mounted on the interior of a windshield for inhibiting the transfer of heat, solar energy, ultraviolet radiation and the like through the windshield into the interior of the associated vehicle comprising:
    (a) a flexible sheet constructed of a plurality of individual sheets of metallized plastic film selected from the group consisting of metallized nylon, metallized polypropylene, metallized polyethylene, metallized polycarbonate, metallized polysulfonate and mixtures thereof, the plurality of individual sheets joined in overlying relationship to one another and defining at least one sealed air pocket positioned between the individual sheets; and
    (b) means for removably mounting the flexible sheet to the interior of the windshield, the mounting means composed of pairs of interconnectable fabric strips of the knit loop and hook type.

* * * * *